Dec. 15, 1936.   R. R. BROGDEN   2,064,518
ART OF TRANSPORTING AND/OR STORING ARTICLES IN UNIT CONTAINERS
Filed June 23, 1932   3 Sheets-Sheet 1
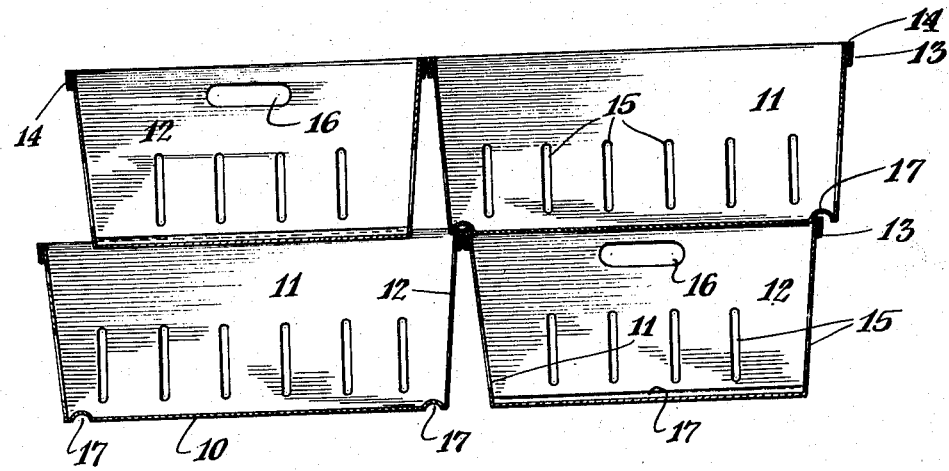
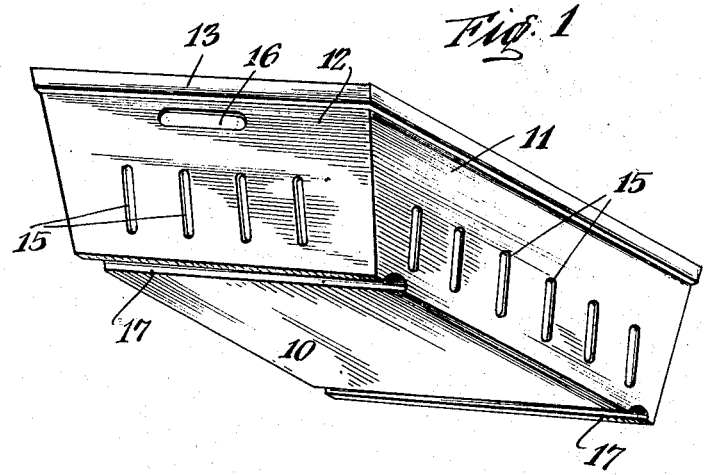
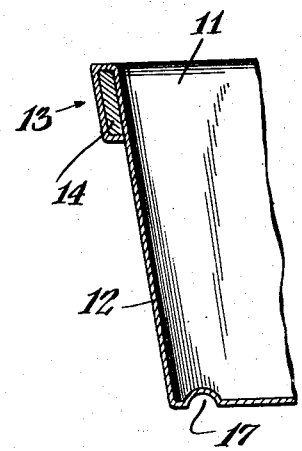
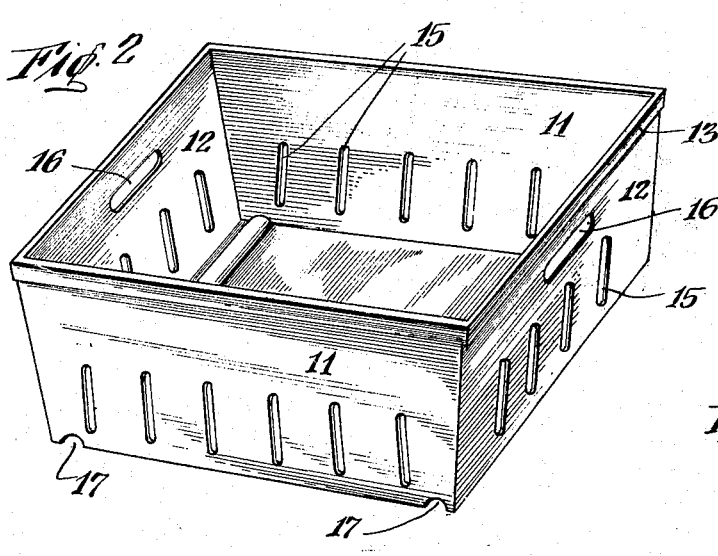
INVENTOR
Ronald R. Brogden
BY
ATTORNEYS Dec. 15, 1936.  R. R. BROGDEN  2,064,518
ART OF TRANSPORTING AND/OR STORING ARTICLES IN UNIT CONTAINERS
Filed June 23, 1932  3 Sheets-Sheet 2

INVENTOR
Ronald R. Brogden
BY
ATTORNEYS

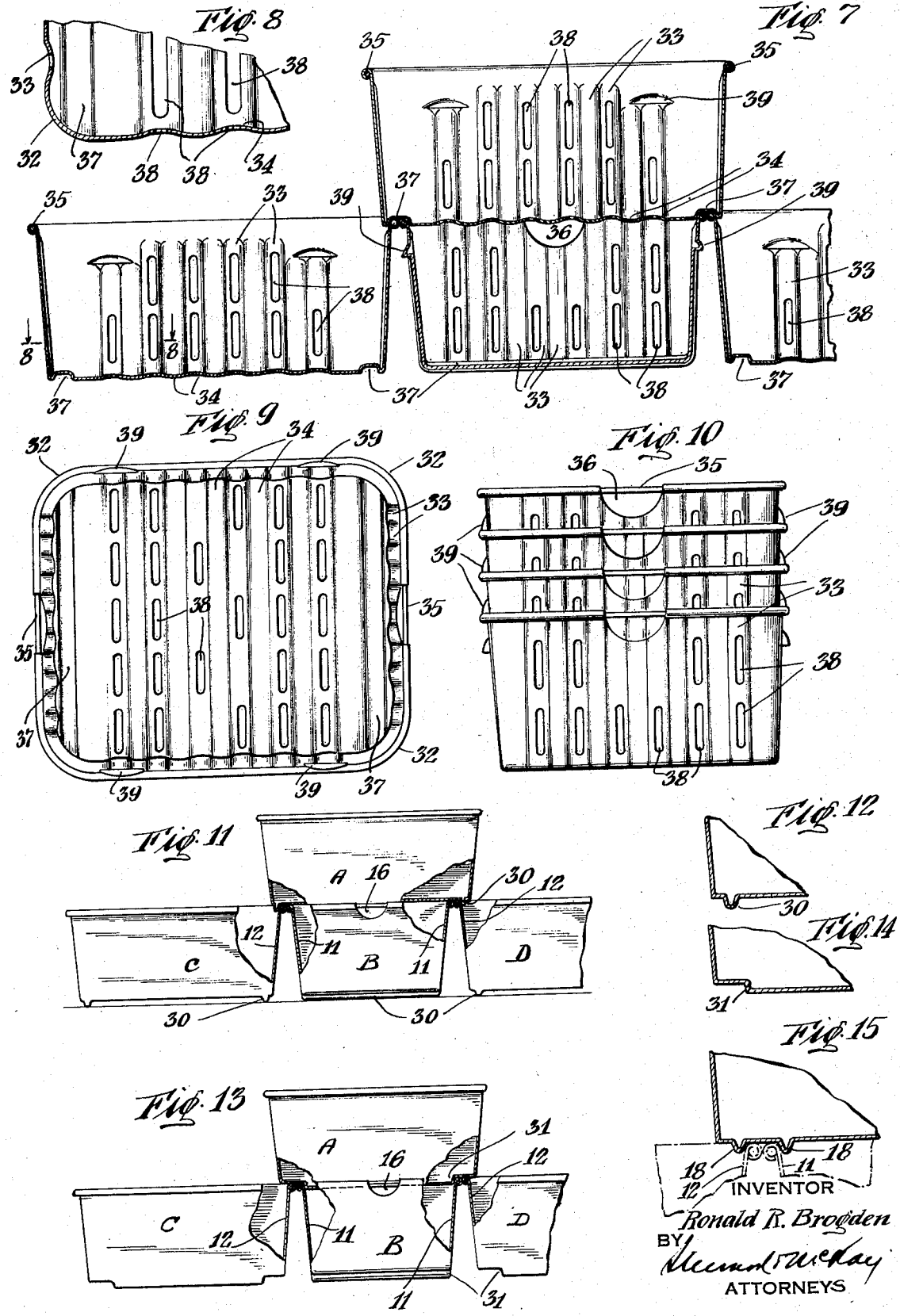

Patented Dec. 15, 1936

2,064,518

UNITED STATES PATENT OFFICE 2,064,518

ART OF TRANSPORTING AND/OR STORING ARTICLES IN UNIT CONTAINERS

Ronald R. Brogden, Pomona, Calif., assignor to Brogdex Company, Winter Haven, Fla., a corporation of Florida Application June 23, 1932, Serial No. 618,970

7 Claims. (Cl. 220—97)

This invention relates to art of transporting and/or storing articles in unit containers; and it comprises not only novel methods of assembling unit containers into container stacks or piles which are themselves likewise novel, but it also comprises novel unit container constructions especially useful and advantageous to employ in such assemblages.

In connection with the production and marketing of many different kinds of relatively small articles, it is necessary to transport or to store them in unit containers, such as boxes or crates, of such size that they may be conveniently handled by one or two men. Considerations of economy, including transportation costs, require such containers to be of the lightest possible construction consistent with strength and with safety to their contents.

In transporting such loaded containers by rail or ship, for example, they have to be carefully stacked or piled in a freight car or ship's hold and securely held in place against shifting due to sudden movements of the car or ship. This is usually accomplished by means of more or less elaborate systems of shoring, blocking, stripping, or the like, which are usually expensive in respect to cost of lumber (or other material) and labor required, time-consuming in use, and often wasteful of shipping space. Also, the height to which the containers may be piled is sometimes unduly limited by low structural strength of the containers themselves or by instability of the resultant stacks or piles. Somewhat similar problems and difficulties arise when such boxes or crates are to be stored in a warehouse or cold storage plant. Rigidity, strength and stability of the stack structures or piles of the unit containers, and resistance thereof to accidental displacement, are essential in any case. The heretofore known types of containers and methods of stacking or piling the same have not been wholly satisfactory for attainment of these ends.

Accordingly, a general object of the invention is to overcome the aforesaid difficulties of the prior art and to attain certain important advantages not heretofore realized, by materially increasing the facility and the economy of labor and space with which unit containers can be assembled in stacks or piles possessing the desired characteristics aforesaid; the unit containers being so constructed that, upon being built up into a stack or pile, in accordance with a novel but simple and easily understood method of arrangement, they automatically interlock to an extent which, although variable within the scope of the invention, is in any case sufficient to give a structurally strong and relatively stable assemblage and which, in the best embodiment of the invention, results in the containers being tied together so completely as to impart to the assemblage the characteristics of a substantially unitary structure of extreme rigidity and resistance to deformation or displacement.

A further and closely related object is to so construct the unit containers and arrange them in stacking that the weight of each container is distributed over those below it in a manner permitting employment of relatively light construction and yet allowing the containers to be stacked high without danger of even the lowermost containers collapsing.

Another object of the invention is prompted by the fact that enormous quantities of perishable commodities, such as fresh fruits or vegetables, are very commonly shipped, and often stored also, in unit containers or crates stacked together in large numbers; and that it is frequently essential in order to prevent extensive deterioration and loss, to ensure ventilation of such commodities by circulating air currents while being so held. It has been found very difficult in actual practice to accomplish this economically with the desired uniformity. Either the circulated air tends to flow mostly in a few well defined channels in the mass of piled containers, without properly contacting all the containers or their contents, or else so much resistance is interposed to the air flow as to require application of power, sometimes in excessive amount, to maintain it. An additional object of the invention is, therefore, to provide an improved method of stacking, most desirably but not necessarily employed in conjunction with the interlocking feature above mentioned, whereby a novel stack structure may be built up embodying a systematic arrangement of internal air channels so disposed and intercommunicating as greatly to enhance the efficiency and uniformity of air circulation throughout the stack.

Still another and more specific object of the invention is to provide an open-top unit container or crate having one or more of its walls apertured for air circulation and having provision whereby, when said container is properly assembled with other like containers into a stack or pile, the containers will interlock and, both by the conformation of their walls and also by the spacing of their walls determined through such interlocking, will cooperate to provide a system of ventilating channels or passages enabling ready and effective access of air to the containers and their contents at substantially all points throughout such stack.

Still another object is to provide unit containers of this type which, when empty, can be compactly nested for convenience of handling and transportation for re-use, and which can nevertheless be easily separated one from another after having been so nested.

With the foregoing objects in view, as well as others which will become apparent hereinafter, the invention consists in the novel methods and mechanical constructions which will first be described in connection with certain desirable practical embodiments by way of typical illustrative examples, and will then be more particularly pointed out in the appended claims.

In one of its more specific aspects possessing very great practical utility, the invention is concerned especially with quantity shipment or storage, in unit containers, of perishable commodities, more particularly fresh fruits and vegetables, which require not only to be adequately protected against mechanical injury from undue pressure or other cause, but also to be freely exposed to ventilating currents of fresh air when in transit or storage for any considerable length of time, in order to avoid excessive depreciation in quality with consequent losses to owners. Accordingly this aspect of the invention will be particularly emphasized hereinafter by way of example in explaining the underlying principle here involved. In its broader aspects, however, the invention is not restricted to unit containers or container stacks providing for ventilation or aeration of the contents, the broad principles of the novel stacking methods and of the constructional features of unit containers and container stacks hereinafter disclosed being applicable wherever articles or commodities can be advantageously transported or stored in unit containers assembled into a strong self-supporting stack or structure by partial or complete interlocking engagement of the component container units one with another. Indeed, as will appear hereinafter, certain important phases of the invention, broadly considered, do not necessarily involve any such interlocking engagement whatever.

For the sake of concrete illustrative examples by which to make clear the important underlying principles upon which the invention rests, methods and means particularly useful in the transportation and/or storage of fresh fruits, such as oranges, grapefruit, lemons, apples, potatoes, or the like, will be hereinafter described in detail in connection with the accompanying drawings which show more or less diagrammatically certain desirable practical embodiments of the invention. In these drawings, Figs. 1 and 2 are perspective views, from different angles, of a desirable form of unit container of a completely interlocking type within the scope of the invention;

Fig. 3 is a vertical section through a stack of such unit containers;

Fig. 4 is a fragmentary vertical section of one of the containers on a larger scale;

Fig. 7 is a view in vertical section, similar to Fig. 3, of a stack of containers of somewhat modified form but also of the completely interlocking type;

Fig. 8 is a fragmentary horizontal section on the line 8—8 of Fig. 7;

Fig. 9 is a plan view of one of the containers shown in Fig. 7;.

Fig. 10 is a side elevation showing several containers nested;

Fig. 11 is a side (or end) elevation of a stack of containers which completely interlock but which have a modified form of interlocking provision;

Fig. 12 is a fragmentary vertical section of a part of one of the containers shown in Fig. 11;

Fig. 13 is a view similar to Fig. 11, except that the containers are of a type which only partially interlock;

Fig. 14 is a fragmentary vertical section of a part of one of the containers shown in Fig. 13; and Fig. 15 is a fragmentary view, in vertical section, of containers having still another form of provision for complete interlocking.

Figure 5:
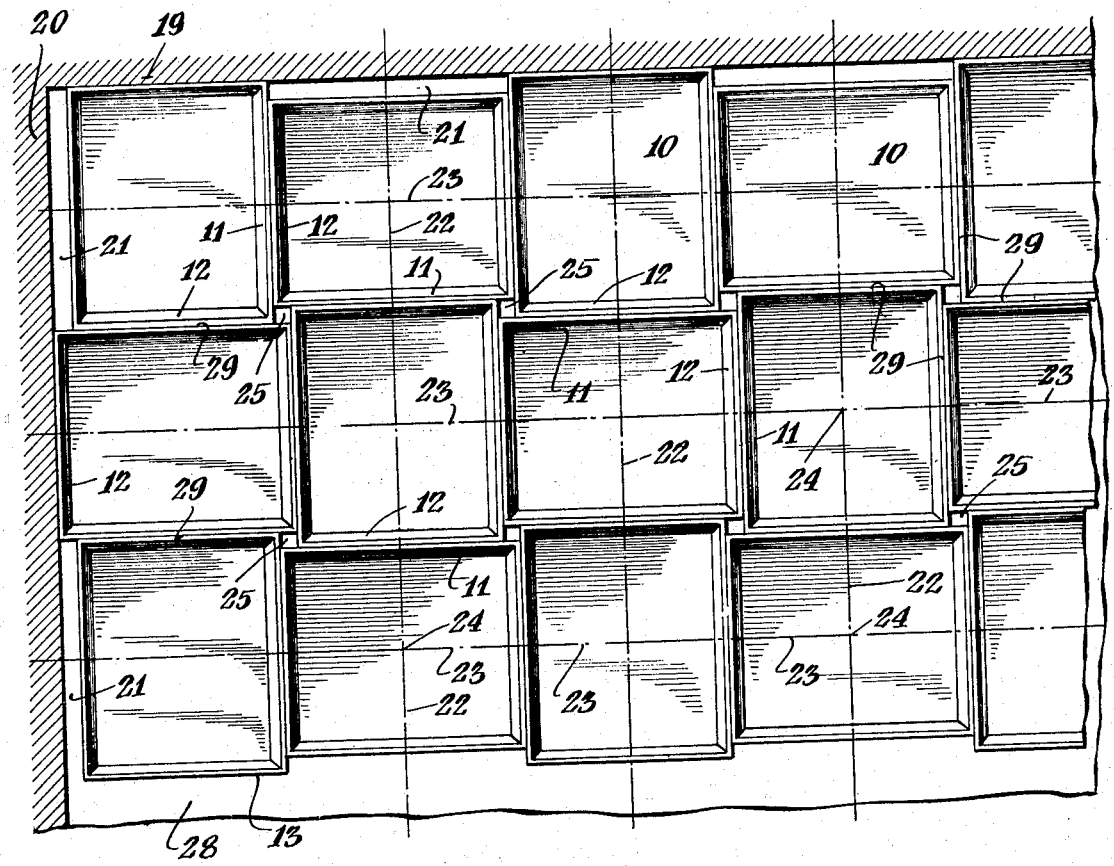
Figs. 5 and 6 show the stack in plan and side (or end) elevation, respectively.

The unit container or crate, in the form here specifically shown, is constructed of sheet metal which, in practice, is usually to be recommended for the purpose. In its general form the container is a rectangular quadrilateral in plan. It is of greater length than width, and is open at the top in the specific examples here illustrated, but this latter is not essential in the broader aspects of the invention. In no case is the ratio of length to width a whole number, and in the examples here illustrated the length is much less than twice the width.

Referring at first more particularly to that form of container shown in Figs. 1 to 6, from the bottom wall 10 of the container the side or longitudinal walls 11, as well as the shorter end walls 12, incline slightly outwardly to an upper edge or rim 13 bounding the somewhat larger open rectangular top. The rim may desirably be reinforced and stiffened by a metal band or rod 14, as shown. Ventilating openings or apertures of any suitable shape, may be provided in one or more of the container walls. The side and end walls are here shown provided with elongated apertures 15. The bottom may be apertured also, although not so shown in this instance; and the shape and distribution of these apertures may be varied, of course, as desired. Hand-holds 16 are also provided in the end walls for convenience in lifting the container.

Figure 6:
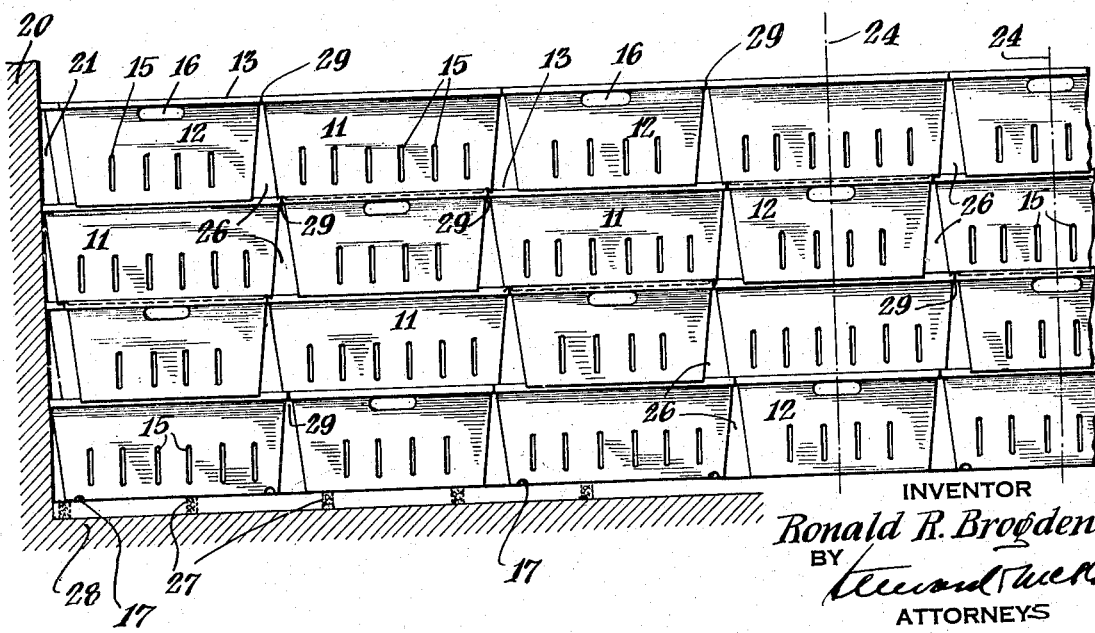

In accordance with the novel stacking method of the invention, the unit containers are intended to be piled or stacked crosswise one upon another, as shown in Figs. 3, 5 and 6. In each horizontal tier or layer of containers composing the stack, each of the containers except those at the outside of the stack has its end edges abutting the side or longitudinal edges of two other containers between which it lies; while its side or longitudinal edges abut the end edges of another pair of containers between which it also lies. With respect to the vertical tiers of containers, it will be seen that each container, except those at the bottom of the pile, is supported crosswise upon the side or longitudinal edges of the container next below.

This method of stacking or piling rectangular containers of unequal length and breadth is believed to be broadly new; and, without regard to the other structural details of the unit containers to be hereinafter described, it produces a novel type of unit container stack or pile possessing important and highly desirable characteristics, as will presently appear, both from the standpoint of structural strength and stability of the stack as a whole, and also from the standpoint of enabling effective and substantially uniform ventilation throughout the entire stack in a very simple manner.

It is also desirable, however, to so construct the unit containers that when stacked or piled as described, they are also automatically locked together, either completely or partially, in such manner that the stack is a substantially rigid unitary structure resistant to deformation or substantial movement upon being subjected to sudden shock or other disturbing force. Within the scope of the invention, a considerable variety of means to effect this end may be employed. In general, however, the means or provision most effective for this purpose comprises parts or elements formed in or upon, or attached to the bottom wall of each individual container; whereby, when the container is superimposed transversely upon a like unit container in the arrangement illustrated in Figs. 3, 5 and 6, such means or provision has locking engagement with the adjacent end edges of the two containers abutting the side or longitudinal edges of said container therebelow. In the present example, such provision or means consists of a pair of transversely extending locking recesses or grooves 17, each wide enough to embrace an abutting pair of upper container edges. Said recesses or grooves 17, which extend across the entire width of the bottom, are parallel with and equidistant from the ends of the container, and the distance between their center lines is substantially equal to the over-all width of the container at its top. In this instance each locking recess has its engaging surfaces curved or otherwise contoured so that when it embraces the abutting edges of subadjacent containers, it exerts a kind of wedging action tending to force and hold those edges firmly together. The greater the number and weight of superimposed containers, the greater is this wedging and locking action. This type of locking means or provision is therefore considered particularly advantageous for the purposes in view and is accordingly recommended in practice. However, it is evident that this wedging type of locking engagement can be attained in other specific ways. Thus, for example, instead of forming the described recesses 17 in the container bottom, the bottom may be provided with two pairs of downwardly projecting ribs 18 (Fig. 15), each pair forming, in effect, a groove adapted to fit over and lock together a pair of container edges. These ribs may of course either be formed directly in the material of the bottom itself or may be simply strips properly attached thereto; and in either case the projecting ribs need not be continuous across the entire width of the bottom. Nor is it essential, in the broader aspects of the invention, that the engaging surfaces of the locking means or provision, whatever form it takes, be curved or otherwise of such character as to exert the described wedging action tending to press the abutting container edges tightly together. It is sufficient that it tend to prevent separation of said edges.

It will be readily seen that containers of the construction above described, when they are to be stacked in the manner described, can be easily placed in proper position by comparatively unskilled workmen. They fit into place without the exercise of special care and automatically interlock in the process of stacking to provide a self-sustaining, strong and rigid assemblage. Moreover, because each container, when not prevented by contact with others laterally abutting it or by the edge-locking action of a superimposed container, is freely slidable in the direction of its own width and longitudinally upon the supporting edges of the containers upon which it rests, proper and easy placement of the containers in stacking the same, as well as ready removal thereof in unstacking, are greatly facilitated. This is highly important where, as often happens, the individual containers with their contents are rather heavy and have to be stacked high or in cramped spaces in a ship's hold, freight car or storage room.

As a result of the inherent strength and rigidity characterizing a stack of containers assembled in the manner just explained, the invention enables realization of the further important practical advantage that the use of securing strips, blocks or other kinds of "dunnage", heretofore indispensible in transporting unit containers in freight cars, ship holds, and trucks, is thus rendered quite unnecessary and may be practically eliminated. Assuming that Figs. 5 and 6 illustrate the containers stacked in a freight car, for example, no stripping or blocking is required except to fill in such slight clearance as there may be between the stack and one or the other side of the car, and also to brace alternate transverse and longitudinal rows of the top tier of containers against the side and end walls 19, 20 as indicated at 21. Since the containers in the top tier or layer of the stack are not locked together by superimposed containers, as are those in the lower tiers, such blocking or stripping is necessary or desirable, as a practical matter, to prevent the top layer containers being displaced and their contents thereby damaged.

It will be seen that in the resultant container stack, the unit containers are uniformly and symmetrically disposed in a plurality of superposed tiers or layers, with the containers of each tier arranged in end-to-side abutment and in rectangularly disposed rows extending, respectively, transversely and longitudinally of the stack. The center lines 22 of the transverse rows are at right angles to the center lines 23 of the longitudinal rows; and in each set of center lines 22 and 23, the center lines are equidistant from each other, the distance between them being equal to the mean of the length and breath of one of the uniform unit containers. Moreover, the containers in a stack thus constructed, are also superposed in columns each of which is symmetrical about a vertical axis 24 passing through the intersection of the corresponding transverse and longitudinal center lines 22, 23. In each column, the unit containers are in alternating or in criss-cross arrangement, as shown.

In a unit container stack constructed in the manner described, it will be seen that there are provided throughout the body of the stack vertical flues or chimneys 25, one at each corner of each column, except at the outside vertical faces of the stack. These vertical flues are interconnected, moreover, by lateral or generally horizontal passages 26 enclosed by the adjacent side and end walls of the stacked containers. As shown in Fig. 6, the lateral passages 26 occur in vertical series in staggered arrangement. This has the effect of discouraging direct vertical travel of air through these lateral passages, even though the container side and end edges may not be in such close abutment as completely to close the upper sides of these triangular lateral passages. Consequently circulation of air through them tends to be generally horizontal, in one direction or the other, toward the vertical chimneys or flues 25 with two of which each lateral passage communicates. In practice, the whole stack of containers commonly rests on stringers 27 which space the stack slightly above the floor 28 of the car or warehouse, thus providing for free circulation of air under the stack.

There is thus provided in such a stack a complete and uniformly disposed network of interconnected vertical and horizontal air passages or flues by which air may circulate systematically, under natural or forced draft, in such manner as to bathe all exposed surfaces of the unit containers composing the stack. Where these containers are provided with ventilating apertures, as here shown, these cooperate directly with this network of air passages in ensuring ample ventilation for the contents of the containers. This is, of course, of the greatest advantage in the shipment or the storage of such perishable articles of food as fresh fruit and the like. Such an arrangement of interconnecting air passages is sometimes desirable, however, even where ventilation of the contents of the containers is not required. For example, it may be desired merely to keep the contents at a certain specified temperature (cooler or warmer than atmospheric) through circulation of a controlled-temperature air supply through the stack; in which case, the unit containers may be entirely closed and even sealed against access of air to their contents.

In the particular form of the invention here illustrated, the lateral air passages 26 are formed by reason of the flaring of the container sides and ends upwardly and outwardly. But this particular contouring or design of the containers is to be understood as not essential to the achievement of this result in the broader aspects of the invention, though the construction and arrangement here shown is eminently practical and is considered most desirable. However, the containers may have vertical sides and ends; and in that case, where the lateral ventilating passages are desired, means may be provided for spacing them apart to a greater or less extent when stacking the containers, such means being either attached to or forming a part of the container itself, or comprising separate spacing means. Generally speaking, such provision should also include means for substantially closing the upper sides or edges of the lateral passages 26. Such variation in the specific manner of forming the lateral passages, as where the unit container sides are vertical, does not alter the fact that when positioned in the stack in the manner described, the containers of the stack may properly be said to be substantially in end-to-side abutment in the superposed tiers or layers.

Another important advantage in this general type of container stack construction or arrangement consists in the relatively uniform distribution of weight and resultant stresses in such manner as to minimize danger of collapse of the lower portions of the stack. Referring more particularly to Figs. 5 and 6, it will be noted that the criss-cross piling of the containers of unequal length and breadth, causes the load to be concentrated along substantially horizontal bearing or thrust lines 29 (both transverse and longitudinal) where it is supported in all cases by two adjacent upright lateral container walls immediately below. Furthermore, these lines 29 of bearing or thrust are staggered both vertically and horizontally, which increases the rigidity of the stack structure. This effect is especially pronounced where, as in the example illustrated, the lateral walls of the unit containers are inclined. Under these circumstances, the bearing or thrust lines 29 are coincident with the upper edges of what are virtually prisms or cells of triangular cross-section which act like supporting and stiffening trusses and which are spaced uniformly throughout the stack in the rectangular and staggered relation described, thus making for maximum rigidity and stability of stack structure.

These desirable results are also practically attainable for the most part if the unit containers are of the construction illustrated in Figs. 11 and 12. Here each container, instead of having the locking grooves 17 (Figs. 1 to 6), is provided with lugs or ribs 30, attached thereto or formed in the sheet metal of which the container may be made, extending transversely of the container and spaced apart an effective distance equal to the over-all top width of the container plus twice the thickness of the top edge. Thus, when such modified containers are piled or stacked in the manner heretofore described and as shown in Fig. 11, the lugs 30 of any container A fit down over the two pairs of abutting edges of containers B, C and D upon which such container is supported, said lugs engaging the inner faces of the end walls 12 of containers C and D, but not engaging the inner faces of the side walls 11 of container B. This arrangement positively locks the containers together, however. The engaging or locking surfaces of said lugs 30 may be inclined or otherwise formed to exert a wedging action such as that described above in connection with grooves 17.

Another type of unit container which may be piled in stacks having many of the desirable characteristics of the stacks hereinabove described is illustrated in Figs. 13 and 14. In this type, the full grooves 17 (Figs. 1 and 6) are replaced by what are virtually half-grooves or open grooves forming stops or shoulders 31 spaced apart a distance equal to the inside top width of the container. When this modified type of container is stacked in accordance with the method described in connection with Figs. 3, 5 and 6, shoulders 31 on the bottom of continer A fit snugly between side walls 11 of container B across which container A is piled, thus enabling the containers to be accurately centered in proper position relative to one another and built up into stacks, in accordance with the stacking method hereinabove set forth, with the same facility as the other types of container already described. The resultant container stack, while not so rigid as a whole because its component individual vertical columns of containers are not locked together laterally as when the containers of Figs. 1 to 6 are used, is built up in the same general manner and possesses the same valuable characteristics with respect to distribution of ventilating air passages, advantageous distribution of weight thrusts, and inherent stability due to the method of stacking employed. Moreover, the component containers of each column interlock, as will be evident. The stack as a whole can be readily shored or blocked in a freight car or ship's hold as may be necessary to prevent displacement therein.

Furthermore, this type of container (Figs. 13, 14) has certain practically important advantages peculiar to itself. Among these is its adaptability for use in situations where the previously described fully or completely interlocking type can be used only with more or less difficulty or not at all. Thus, where it may be desired to extend laterally a stack already constructed, or where it is not convenient to build up the stack stepwise as is practically necessary in using the completely interlocking type, these conditions are more satisfactorily met because the half-groove or shoulder formation permits a container to be slid laterally into place against another upon which a third already has been placed, whereas this is not feasible with the completely interlocking type.

In the embodiment of the invention illustrated in Figs. 7 to 10 inclusive, the unit container is of the completely interlocking type but embodies additional valuable features rendering it especially desirable and practical. Although the container is of generally rectangular quadrilateral form, the corners 32 are rounded. The side and end walls are provided with vertical corrugations 33, the bottom being similarly corrugated as indicated at 34. This adds greatly to the structural strength and stiffness of the container, enabling it to be made of relatively thin gauge metal. The upper edges of the side and end walls, which are inclined outwardly toward the open top of the container, are turned over and around a round stiffening rod 35, the end walls being cut away as indicated at 36 to expose a portion of said rod and provide hand-holds. The locking grooves 37 are curved in cross section and, like grooves 17 of the container illustrated in Figs. 1 to 4, exert a wedging action on the two pairs of contiguous end and side walls of subadjacent abutting containers, as shown in Fig. 7, when the containers are stacked crosswise in the manner hereinabove described. The distance between the center lines of locking grooves 37 is, of course, substantially equal to the over-all width (shorter dimension) of the container at the top. Ventilating apertures 38 may be provided in the bottom, side and end walls, as shown.

This form of container is also provided on its side or longitudinal walls with pairs of opposed outwardly projecting lugs or stops 39, permitting the containers to be nested, as shown in Fig. 10, in such manner that the empty containers can be stored in relatively small space and yet can be very easily separated one from another when again required for use. These lugs or stops are located a sufficient distance below the upper edge of the container to ensure that, when the container is nested within another, it will be prevented from dropping so far into the other container as to cause the sloping sides of the containers to bind or wedge together and thus resist separation. When the containers are nested as shown in Fig. 10, the lugs of each container rest upon the upper edge of the container next below, and the hand-holds 35, 36 in the end walls of each container are left exposed so that each container may be easily grasped and lifted out of nesting position whenever desired.

In order to enable stacking the containers in this nested relation to a suitable height, and at the same time ensure firm seating of one upon the other and entire absence of any tilting or rocking action as well as undue warping strains upon any container due to weight of the superimposed nested containers, it is important for best results that there be at least two pairs of opposed nesting lugs 39 distributed around the periphery of the container at rather widely spaced points. As here shown, the two pairs of lugs are both on the side or longitudinal walls of the containers, and this arrangement is found in practice to be very advantageous in securing the desired stability of a stack of nested containers and in properly distributing the weight carried by the edges of containers below the top of the stack. Other arrangements of the lugs or stops are of course feasible within the scope of the invention, however, so long as the number and arrangement is such as to prevent tilting or rocking of the nested containers one upon the other, and so long as they are so positioned as substantially to prevent the nested containers binding and sticking together.

The type of container illustrated in Figs. 7 to 10 may desirably be formed of one piece of metal by drawing and stamping with suitable dies, using steel of the appropriate composition, for example. It is found in practice that this method of manufacture makes it possible to obtain maximum strength and rigidity, with minimum weight, in a container of the character herein described. In a typical instance, the container may be constructed of sheet steel of about 0.037 inch thickness, with outside or over-all top dimensions of 22 by 26 inches, inside top dimensions of 21 by 25 inches, and inside bottom dimensions of 19.5 by 23.5 inches. These dimensions are of course merely illustrative of what has been found to be good practice in a specific embodiment of the invention and are in no sense intended to be restrictive. It is to be noted, however, that when the container dimensions are proportioned in the general manner just indicated, the locking means, such as grooves, with which the bottom is provided are located fairly close to the ends of the container, and that when placed cross-wise upon another container in the manner described, the uppermost container extends only a comparatively short distance beyond each upper longitudinal edge of the container below. Because of this, the upper container is supported fairly close to its ends where it is most rigid, thus making for maximum rigidity of an assembled stack of such containers so placed. Moreover, this general proportioning of the container, wherein the length is only moderately greater than the width, results in the further advantage that the generally vertical air passages or chimneys formed at the corners of the containers in the assembled stack are not unduly large and wasteful of space but are nevertheless ample to provide effective ventilation.

What I claim is:

1. A unit container having a generally rectangular bottom wall of unequal length and width, lateral walls extending upwardly and outwardly therefrom to upper edges bounding a similarly rectangular open top, said lateral walls comprising a pair of opposed sides and a pair of opposed ends shorter than the sides, at least one of the aforesaid walls being apertured to permit passage of air, and the bottom being provided with a pair of parallel rectilinear transverse recesses or grooves which are equidistant from the container ends and have their center lines spaced apart a distance substantially equal to the shorter over-all dimension of the rectangular open top of the container, each recess being of a width enabling it to fit over a pair of contiguous upper edges of a pair of side and end walls of similar containers upon which the container may be stacked.

2. A unit container having generally rectangular bottom, side and end walls, and being of greater length than width, the bottom being formed with a pair of locking recesses or grooves extending across its entire width parallel with its shorter edges and equidistant therefrom, the distance between the center lines of said recesses being substantially equal to the overall width of the container at its top.

3. A unit container adapted to hold perishable articles of food and to be assembled in interlocking engagement with a plurality of other like unit containers to form a stack or pile having a plurality of internal ventilating passages, said unit container having outwardly flaring walls, being generally rectangular in plan, of greater length than width, and provided on its under side with a pair of locking grooves extending across its entire width parallel to and equidistant from the shorter lower edges of the container, the center lines of said grooves being spaced apart a distance substantially equal to the distance between the upper longitudinal edges.

4. An open-top unit container of generally rectangular shape and of greater length than width, having its bottom provided with a plurality of edge-engaging means disposed in two localities equidistant from its ends and each operative to lockingly engage and resist separation of two abutting edges of subadjacent like containers, the mean effective distance between said edge-engaging means being substantially equal to the over-all top width of said container.

5. An open-top unit container of generally rectangular shape and of greater length than width, having its bottom provided in two localities equidistant from its ends with outwardly projecting stop means, the effective distance between said stop means being substantially equal to the over-all top width of the container plus twice the thickness of its upper edge.

6. An open-top unit container of generally rectangular shape and of greater length than width, having its bottom provided in two localities equidistant from its ends with outwardly projecting stop means, the effective distance between said stop means being substantially the inside top width of the container.

7. A unit container as defined in claim 3, further characterized by the fact that the unit container has at least one of its walls apertured to permit passage of air.

RONALD R. BROGDEN.